Dec. 18, 1928.
J. SESSINGHAUS
1,695,864
INSTRUMENT TRANSFORMER MOUNTING
Filed April 23, 1926
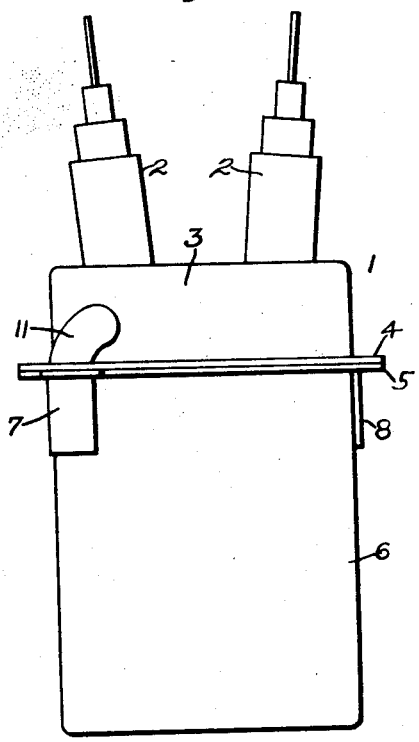
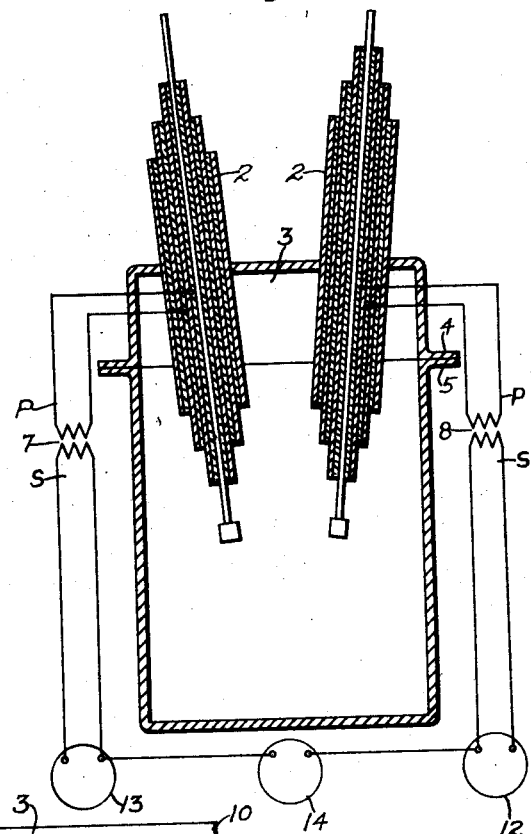
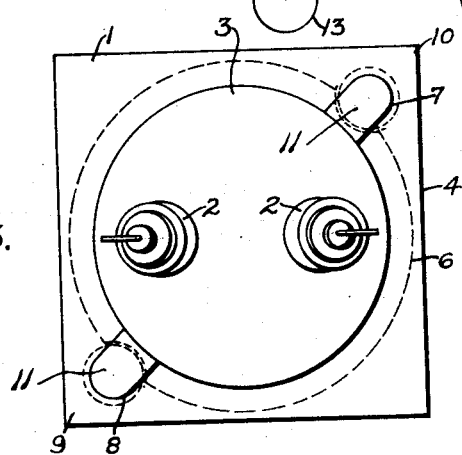
INVENTOR
Johannes Sessinghaus Patented Dec. 18, 1928.

1,695,864

UNITED STATES PATENT OFFICE.

JOHANNES SESSINGHAUS, OF BERLIN-CHARLOTTENBURG, GERMANY, ASSIGNOR TO WESTINGHOUSE ELECTRIC & MANUFACTURING COMPANY, A CORPORATION OF PENNSYLVANIA.

INSTRUMENT-TRANSFORMER MOUNTING.

Application filed April 23, 1926, Serial No. 104,113, and in Germany October 27, 1925.

My invention relates to the mounting of instrument transformers and it has for its object to provide a simple and safe means for switching and synchronizing high-voltage sources.

In order to connect high-voltage lines in parallel, the voltmeters or synchronizing devices, such as incandescent lamps, Geisler tubes and synchroscopes, have heretofore been connected to the secondary windings of transformers the primary windings of which were connected to condenser bushings of the oil-insulated circuit interrupter instead of directly to the terminals.

My invention provides a device of this kind which is especially applicable to outdoor service, but which may be used in the ordinary switching installations, and which is simple irrespective of the high operative voltages.

My invention consists in mounting the transformers to the secondary windings of which the voltmeter and synchronizing devices are connected, directly on the cover of the oil-insulated circuit interrupter, the primary windings thereof being connected to the condenser bushings of the breaker. This arrangement is advantageous in that the devices subjected to the high voltage are mounted directly on the casing of the circuit interrupter and only the low-voltage conductors lead to the measuring devices.

The transformers may be mounted on the cover in any desired manner, but I prefer to make the cover members of rectangular section for tanks of circular section, and to locate the transformers in diagonally opposite corners below the cover.

Figure 1 of the accompanying drawing is a side view of a circuit interrupter embodying my invention, and Figs. 2 and 3 are a cross-sectional and a top plan view, respectively, of the high-voltage circuit interrupter shown in Fig. 1.

A circuit interrupter 1 is provided with condenser bushings 2, and a cover 3 that has a rectangular flange plate 4 by means of which it rests upon, and is secured to, the flange 5 of the cylindrical tank 6. Transformers 7 and 8 are mounted under the flange 5 at the corners 9 and 10. The primary windings P are connected to certain of the conducting layers of the condenser bushings 2 through conduits 11. The secondary windings S are connected to voltmeters 12 and 13 and to a synchronizing device 14. The voltmeters 12 and 13 and the synchronizing device 14 may be located at any desired place.

With my invention, there is no danger of the operator coming into contact with high-voltage conductors when observing and manipulating the instruments 12, 13 and 14 because of the fact that the high-potential windings of the transformers are connected to layers on the condenser bushings which are at a lower potential than the circuit to which the interrupter 1 is connected. Furthermore the transformers are mounted on the interrupter tank 6 and are, consequently, grounded for purposes of protection.

While my invention has been shown and described as embodied in a specific structure, it will be understood that structural details and arrangement of parts may be considerably varied, without departing from the spirit of the invention.

I claim as my invention:

1. The combination with a circuit interrupter casing comprising a tank, condenser terminal bushings on said tank and an instrument transformer mounted on the tank and having its primary winding connected across layers of a terminal bushing.

2. The combination with a casing for an electrical device, of a transformer having a casing carried by said first named casing and contacting directly therewith, said transformer comprising a conductor connected interiorly of first named casing, and a conduit through which said conductor extends.

3. The combination with a casing for an electrical device, said casing comprising a flange, of a transformer having a casing mounted on said flange and contacting directly therewith, said transformer comprising a conductor connected interiorly of said first named casing.

4. The combination with a casing for an electrical device, said casing comprising a flange, of a transformer secured to said flange and contacting therewith, said transformer comprising a conductor connected interiorly of said first named casing, and a conduit through which said conductor extends.

In testimony whereof, I have hereunto subscribed my name this 20th day of March, 1926.

JOHANNES SESSINGHAUS.